J. GASSER.
COMBINATION HIGH HOIST AND DUMP WAGON.
APPLICATION FILED AUG. 29, 1921.

1,435,836.

Patented Nov. 14, 1922.
2 SHEETS—SHEET 2.

Joseph Gasser.
INVENTOR

WITNESS:

BY
ATTORNEY

Patented Nov. 14, 1922.

1,435,836

UNITED STATES PATENT OFFICE.

JOSEPH GASSER, OF TRENTON, NEW JERSEY.

COMBINATION HIGH HOIST AND DUMP WAGON.

Application filed August 29, 1921. Serial No. 496,388.

*To all whom it may concern:*

Be it known that I, JOSEPH GASSER, a citizen of the United States, residing at 402 Greenwood Avenue, Trenton, in the county of Mercer and State of New Jersey, have invented new and useful Improvements in Combination High Hoists and Dump Wagons, of which the following is a specification.

This invention relates to wagons and more particularly to power driven vehicles of the motor truck type which are adapted to have their bodies tipped or raised in an inclined direction whereby the contents can be easily discharged or dumped and said body returned to normal position on the vehicle chassis with a minimum expenditure of time and labor.

The primary object of my present invention is to provide a combined high-hoist and dump wagon; or in other words to furnish a power actuated vehicle characterized by the fact that the body portion thereof may be raised high for the discharge of its contents, or simply inclined from the horizontal relative to the underframe or chassis for ordinary dumping purposes.

Another object of this invention is to provide a novel mechanism for vehicles of the kind referred to whereby the body raising and lowering means can readily be adapted for simply tilting said body into an inclined position on the chassis or underframe for ordinary purposes.

With the foregoing and other objects in view as will later on be more apparent from the following description, my invention accordingly consists in the novel features of construction, combinations of elements and arrangements of parts which are illustrated in the drawings herewith and fully described by the following text, the scope of said invention being later on more specifically defined by the appended claims.

In the further disclosure of the invention reference is to be had to the accompanying drawings constituting a part of this specification, and in which like characters of reference denote the same or corresponding parts in all the views.

Figure 1:
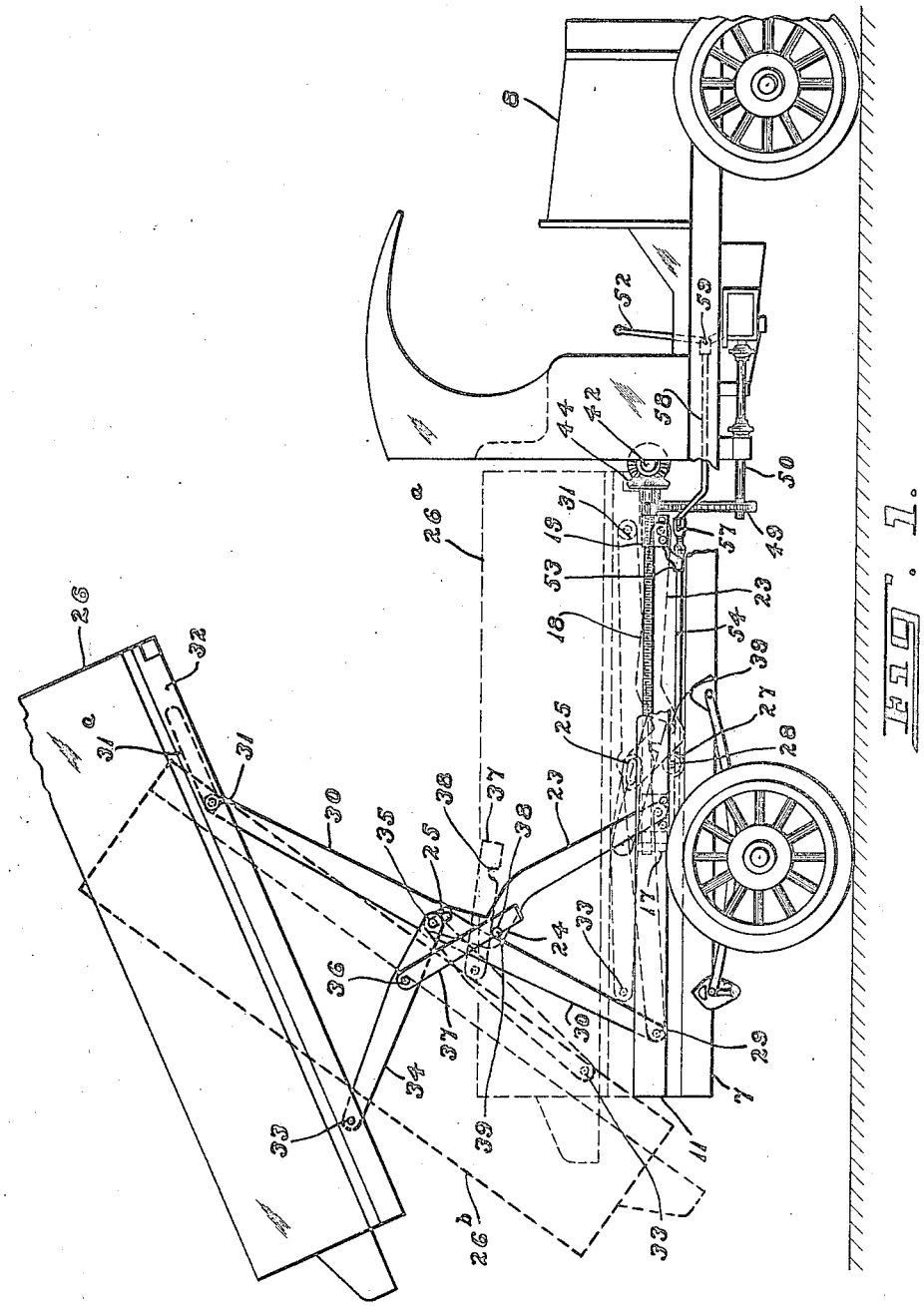
Figure 1 is a side elevation of a motor truck or wagon having my present improvements applied thereto, the body being shown by full lines in the high-hoist position and by dotted lines in the normal and ordinary dumping positions.

Referring more particularly to the views the numeral 7 designates the chassis or underframe of an ordinary motor-truck 8 the transmission shaft and transmission gearing whereof are respectively indicated by the reference characters 9, 10. Mounted or otherwise formed on the chassis 7 is a substantially rectangular frame 11 including side members 12 and a rear cross-member 13 which are rigidly connected together in any of the well known ways, said frame having inner facing strips 14 for a part of its length which are conveniently secured thereto by button-headed screws 15 whereby the forward ends of said side members 12 are made of box-like formation to constitute longitudinal guides 16 for the purpose later on explained. Journaled in appropriate bearings 17 in the side members 12 are screw-rods 18 on which are threaded blocks 19 supported on anti-friction rollers 20 and of a cross-section to be freely movable forwards or rearwardly in the aforesaid guides 16. Mounted transversely of the frame 11 and journaled in bearings 21 in the blocks 19 is a horizontal shaft 22 on which are pivoted the forward ends of link members 23 the free ends whereof are shaped or formed to constitute knee-pieces 24 having elongated slots 25 therein the purpose and function whereof will later on be fully explained. The knee-pieces 24 when in normal position—that is to say when the dump box or vehicle body 26 is resting on the frame 11— are supported on freely rotatable rollers 27 appropriately mounted on stub axles 28 provided for the purpose at each side of said frame 11; or said rollers 27 may be supported by a transverse shaft as will be obvious to those acquainted with the art to which this invention appertains.

Pivotally connected in any appropriate manner on stationary points 29 on each inner side 12 of the frame 11, and in opposed relation are levers 30, the forward ends whereof are fitted with anti-friction rollers 31 that traverse longitudinal slots or guides 31ª in the underframe 32 of the dump box or body 26; or said levers 30 may be similarly pivoted at both ends on cross shafts or rods, the forward one having the rollers 31 thereon, as will be obvious to those acquainted with the art. Pivoted at 33 to the underframe 32 are links or levers 34 the opposed ends whereof are likewise mounted on a transverse cross-shaft or rod 35 passing through the aforesaid elongated slots 25 whereby operative connection is established between the levers 30 and toggles 34 as later on explained. Hingedly mounted on the links or levers 34 at 36 are latch links 37 having notches 38 in their undersides for locking engagement on stops or studs 39 provided for the purpose on the aforesaid knee-pieces 24, it being obvious that this latching connection is of a nature to prevent displacement of the parts just described when in operative connection.

Figure 2:
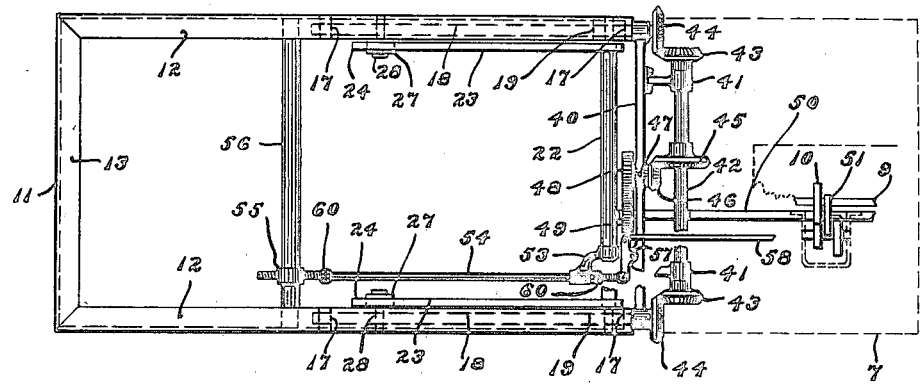
Figure 2 is a plan view of the underframe and the mechanism associated therewith.
Figure 3:
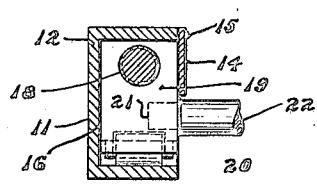
Figure 3 is an enlarged detail end view of one of the underframe traversing blocks hereinafter more particularly described.
Figure 4:
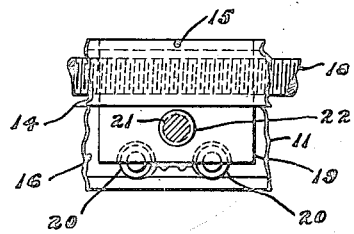
Figure 4 is a side view looking towards the left hand of the preceding figure.

Transversely of the front end of the frame 11 is a cross-beam 40 having bearings 41 in which are journaled a cross-shaft 42 having gears 43 in mesh with corresponding gears 44 on the forward ends of the screw rods 18 and by means of which said rods 18 are rotated to traverse the blocks 19 rearwards or forwardly in the guides 16. Intermediate the ends of the cross-shaft 42 is a bevel-gear 45 in mesh with a spur gear 46 one end of a shaft journaled at 47 in the aforesaid cross beam 40, a toothed wheel 48 on the other end of said shaft being in gear with a second wheel 49 on a counter-shaft 50 adapted to be driven by means of a clutch gear 51 from the transmission gearing 10, and said gear 51 is movable into and out of operative connection by a hand or control lever 52 in any of the well known ways. Depending from the aforementioned horizontal shaft 22 is an elbow bearing or member 53 adapted to be moved longitudinally on a trip rod 54 the rear end whereof is supported by a depending bracket or arm 55—Figure 2—collared on—or cottered to—a transverse shaft or rod 56, and the forward end of this trip rod 54 is pivotally joined to one end of a laterally movable lever 57 conveniently mounted on the cross-beam 40 in any of the well known ways. Connected with the other end of this laterally movable lever 57 is a draw-rod 58 in turn forked at 59 on to the aforesaid hand or control lever 52. It is to be here noted that both ends of the trip-rod 54 are screw threaded to receive lock-nuts 60 which serve as bumpers to trip the mechanism just described and automatically move the clutch gear 51 to neutral when the dump-box or body 26 reached its limits of movement in either direction.

Figure 6:
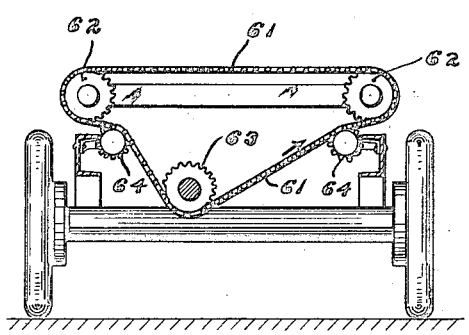
Figure 6 is a detail end view of a slightly modified form of the invention.
Figure 5:
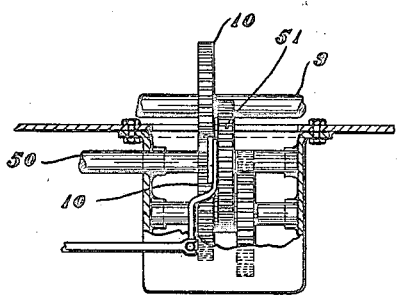
Figure 5 is an enlarged detail plan—partly in section—of the transmission and clutch gearing for effecting the raising, lowering, and inclining of the vehicle body.

In the modified form of the invention shown by Figure 6 it will be observed that a chain drive 61 passing over chain-wheels 62 on the forward ends of the screw rods 18 and a chain wheel 63 on the counter shaft 50 is substituted for the gears 43, 44, 45, 46, 48 and 49; idlers 64 being fitted where necessary to maintain said chain drive 61 taut.

The construction assembly and inter-relation of the several parts having been fully set forth by reference to the several views it will now be clearly apparent that when the dump-box or body 26 is resting in a horizontal or the normal position as indicated by the dotted line position 26ª in Figure 1 upon the rectangular frame 11 and it is desired to elevate same to the high-hoist dumping position shown by the full lines in said figure, the operator or driver of the truck moves the hand or control lever 52 from the neutral to the desired position for throwing the clutch gear 51 into mesh whereby the counter shaft 50 is rotated and through the gears 49, 48, 46 and 45 revolves the cross-shaft 42, which in turn through the gears 43, 44 imparts motion to the screw-rods 18. Rotation of these screw rods 18 in the proper direction will result in the movement rearwards of the blocks 19 and consequential therewith in initial upward movement of the rear ends of the link members 23. This initial upward movement of the rear ends of the link members 23 due to the provision of the elongated slots 25 therein and the simultaneous travel of the knee-pieces 24 over the rollers 27 results in a primary raising of the front end of the dump-box or body 26 before the full thrust of the screw rods 18 is exerted to lift and move the said body 26 upwards and into proper dumping inclination. Following on this initial or primary lift to the forward end of the dump-box or body 26 and as the blocks 19 continue to move rearwards in the guides 16 it will be clearly understood that the link members 23 will swing the side levers 30 upwards on their pivots 29 while at the same time the links or levers 34 being latched by the links 37 to the stops or studs 39 will support and elevate the rear end of the dump-box or body 26 to the position shown by the full lines in Figure 1. As the dump-box or body 26 reaches this position it is to be noted that the elbow bearing 53 contacts with the rear lock-nuts 60 on the trip rod 54 and through the connections hereinbefore described will throw the clutch gear 51 automatically back into neutral or inoperative position.

On the other hand, when it is desired to simply dump the box or body 26 without raising same to the high-hoist position the latch links 37 are disconnected from the stops or studs 39 when it will be seen that as the blocks 19 are moved rearwards with the consequential upward thrust of the link members 23, the side levers 30 will be swung upwards as shown whereas the toggles 34 will simply serve to move the dump-box or body 26 slightly rearwards over the end 13 of the frame 11 due to the slotted connection 25 whilst the latch links 37 will ride over the stops or studs 39 and said dump-box or body 26 will occupy the position designated 26$^b$ on Figure 1.

When the dump-box or body 26 is to be returned to its normal position on the chassis 7 the operator or driver of the vehicle moves the aforementioned hand or control lever 52 in an opposite direction which effects a reverse rotation of the screw rods 18 through the mechanism hereinbefore described and the forward travel of the blocks 19 until the elbow-bearing 53 strikes the forward locknuts 60 whereupon the clutch gear 51 is automatically moved into neutral position as above set forth.

From the foregoing description and explanation of the operation of my invention, its simplicity, usefulness and ready practical application to new or existing motor or other power driven trucks and vehicles will be clearly apparent; and while there has been carefully described one particular embodiment thereof it will be perfectly obvious that various detail changes may be effected, and other combinations of the several parts arranged without in any way departing from the spirit of said invention, and it is hereby intended to include all such reasonable changes or variations thereof as reasonably fall within the scope of the appended claims.

Having described my invention what I claim as new and desire to secure by Letters Patent is:—

1. In a combined high-hoist and dumpwagon the combination with the understructure and body thereof of an interposed frame, blocks slidable longitudinally in said frame and having a shaft supported thereby, link members pivoted at one end on said shaft and having their opposed ends knee-shaped and slotted, levers mounted on stationary pivots in the aforesaid frame and having their free ends slidably connected into the forward part of the body understructure, links between the rear portion of the said body understructure and the slotted knee-shaped portions of the link members, means whereby said links and link members may be held in rigid alignment when the vehicle is used for high-hoist dumping, means for imparting an initial upward inclination to the link members before the body raising thrust is exerted, power reverse mechanism controlling the movements of the slidable blocks, and means for automatically shifting the power reverse into neutral as the vehicle body reaches its limits of inclination.

2. In a combined high-hoist and dumpwagon the combination with the understructure and body thereof of an interposed frame, blocks slidable longitudinally in said frame and having a shaft supported thereby, link members pivoted at one end on said shaft and having their opposed ends knee-shaped and slotted, side levers mounted on stationary pivots near the rear end of the aforesaid frame and having their free ends slidably connected into the forward part of the body understructure, a shaft transverse to the interposed frame and journaled in the knee-shaped slotted ends of the aforesaid link members, links connecting said shaft with fixed pivots near the rear end of the body understructure, means whereby said links and link members may be held in rigid alignment when the vehicle is used for high-hoist dumping, means for imparting an initial upward inclination to the link members before the body raising thrust is exerted, power reverse mechanism controlling the movements of the slidable blocks, and means for automatically shifting the power reverse into neutral as the vehicle body reaches its limits of inclination.

3. In a combined high-hoist and dumpwagon the combination with the understructure and body thereof of an interposed frame, blocks slidable longitudinally in said frame and having a shaft supported thereby, of the frame 11 due to the slotted connection shaft and having their opposed ends knee-shaped and slotted, side levers mounted on stationary pivots near the rear end of the aforesaid frame and having their free ends slidably connected into the forward part of the body understructure, a shaft transverse to the interposed frame and journaled in the knee-shaped slotted ends of the aforesaid link members, links connecting said shaft with fixed pivots near the rear end of the body understructure, latch links pivoted on the aforesaid toggles and adapted for holding the links and link members in rigid alignment when the vehicle is used for high hoist dumping, means for imparting an initial upward inclination to the link members before the body raising thrust is exerted, power reverse mechanism controlling the movements of the slidable blocks, and means for automatically shifting the power reverse into neutral as the vehicle body reaches its limits of inclination.

In testimony whereof I affix my signature.

JOSEPH GASSER.